Aug. 27, 1929.  M. J. BURKE  1,726,176

PORTABLE FIRE HOSE CUT-OFF VALVE AND LEAK STOP

Filed Jan. 20, 1928

INVENTOR
Myles John Burke
BY C. Campbell Hunsicker
ATTORNEY

Patented Aug. 27, 1929.

1,726,176

UNITED STATES PATENT OFFICE.

MYLES JOHN BURKE, OF JERSEY CITY, NEW JERSEY.

PORTABLE FIRE-HOSE CUT-OFF VALVE AND LEAK STOP.

Application filed January 20, 1928. Serial No. 248,107.

This invention relates to a portable fire hose cutoff valve and leak stop.

In fighting fires it frequently becomes necessary to run a line of hose a thousand feet or more from the hydrant or pumping engine. In such case valuable time is lost in adding hose due to the necessary run to and fro to shut off and turn on the water in the addition of the hose. Weak spots sometimes develop in the hose causing leaks and even a bursting of the hose. A quick means of stopping the leak or preventing the bursting of the hose is essential not only because of the time element but also because the lives of the firemen in the building may depend upon the uninterrupted flow of the water in the hose.

One of the objects of this invention is to provide a portable shut off valve.

Another object of the invention is to provide means for stopping leaks and to prevent the bursting of the hose when such leaks occur. Still another object of the invention is to provide means for shutting off the water through a fire hose at any spot throughout its length.

Referring to the drawings.

Figure 1:
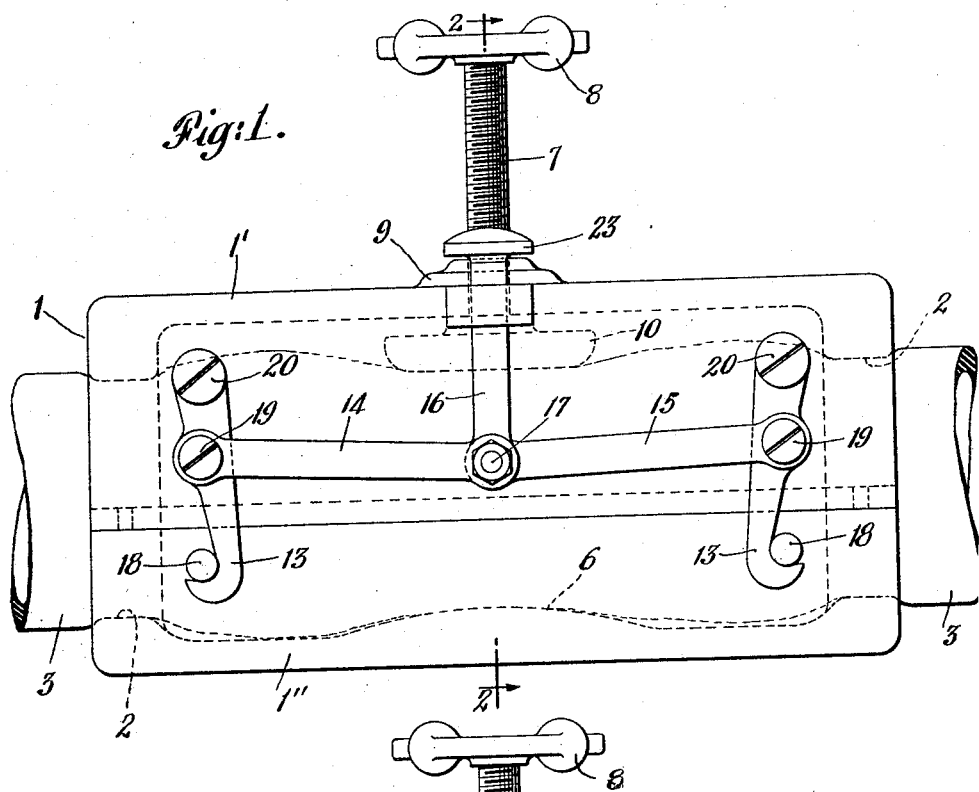
Figure 1 is a view in front elevation of a device embodying the principles of my invention.
Figure 2:
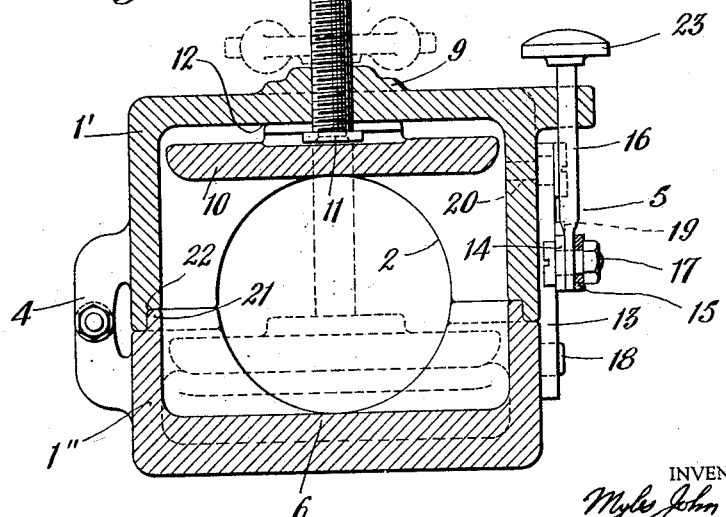
Figure 2 is a cross sectional view of Figure 1 along the line 2, 2, looking in the direction of the arrows.

In carrying out my invention I propose to provide a box 1 having circular cutout openings 2, 2, in the ends thereof to accommodate fire hose 3. Openings 2, 2, are of a slightly lesser width than the outside diameter of the hose. Box 1 is composed of a top and bottom portion 1', 1'', having hinges 4 in the back thereof and toggle catches 5 in the front thereof. In the base of box 1 is a raised section 6 of the same elevation as the bottom of openings 2, 2. In the top or lid 1' of box 1 is a valve stem 7, threaded in boss 9. The base of stem 7 has secured thereto plate 10 preferably by a ball or swivel joint 11. Stem 7 is operated by handwheel 8. Surface 12 on the underside of lid 1', acts as a stop for plate 10. Toggle 5 comprises catches 13, links 14, 15 and 16, connected by pivotal connection 17. Pegs 18 are preferably cast in the front side of the bottom part of 1'' for latches 13. Latches 13 are pivotally secured to links 14, 15, by pivotal connections 19 and to the front side of top 1' by pivotal connections 20. Bottom portion 1'' has a rim 21 which fits in a recess 22 of top portion 1' in order to make the box semiwater-tight.

In utilizing the device as a stop valve the handle 23 of toggle 5 is lifted which loosens the latches 13 from pegs 18 and raises cover 1'. The bottom portion 1'' is slipped under the fire hose which rests in openings 2, 2. Cover portion 1' is then closed on bottom portion 1'' and the handle 23 is pushed down in order that latches 13 will engage pegs 18. Handwheel 8 is then turned so that plate 10 squeezes fire hose 3 together shutting off the flow of water. When used as a leak stop, plate 10 is withdrawn at the top of box 1 and the box is closed over the hose so that the leak is within the box. As the fabric of the hose swells it completely fills the openings 2, 2, and the water pressure builds up in the box to counteract the leak and prevent bursting of the hose.

It will thus be seen that this invention provides a convenient portable and practicable means of shutting off the flow of water in a fire hose at any place in its length and which also can be used to stop leaks.

What I claim is:—

1. A portable fire hose cut off valve and leak stop comprising a container having top and bottom sections pivotally connected, semi-circular openings in the ends of said sections, forming circular openings of a slightly lesser diameter than a wet fire hose, means for locking said sections together, a raised portion within said container, a plate to compress the hose against said raised portion and a threaded stem having a swivel connection to said plate, said stem operatable from without said container.

2. A portable fire hose cut off valve and leak stop, a sectional container adapted to be fastened around a fire hose, openings in the ends of said sectional container of a slightly lesser diameter than a fire hose, means for locking said sections around said hose, means for making said sectional container water tight and a valve within said container operatable from without said container.

3. A portable fire hose cut off valve and leak stop comprising a container, said container having top and bottom sections pivotally connected, semi-circular openings in the ends of said sections forming circular openings of slightly lesser diameter than a wet fire hose when said sections are closed, means for locking said top and bottom sections together about a fire hose and means within said container operatable from without said container for shutting off the flow of water through said fire hose.

Signed at Jersey City, in the county of Hudson and State of New Jersey this 20th day of December A. D. 1927.

MYLES JOHN BURKE.